March 11, 1941.   J. BRUECKER   2,234,893
SHAVING IMPLEMENT
Filed Nov. 22, 1939   2 Sheets-Sheet 2
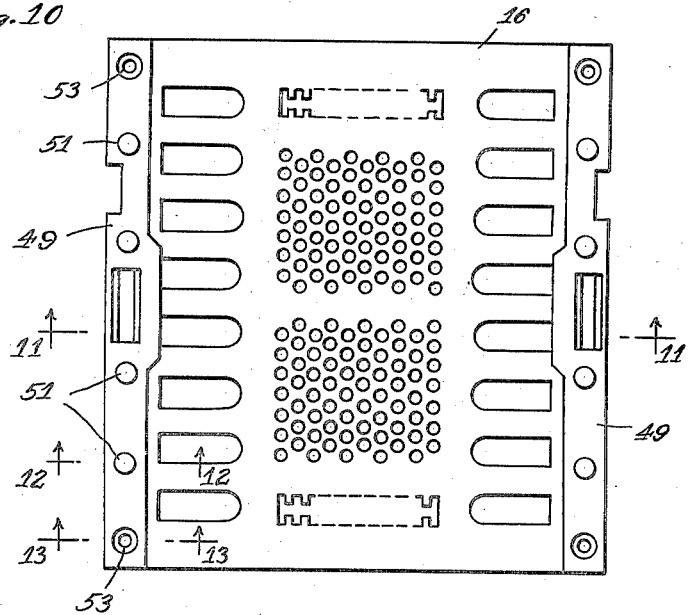
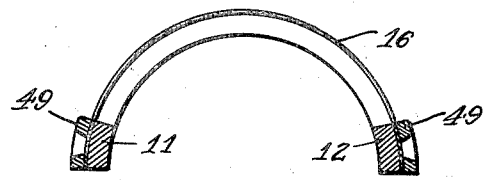
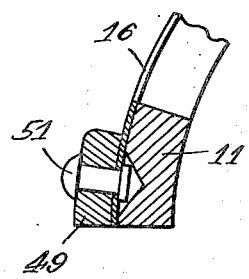 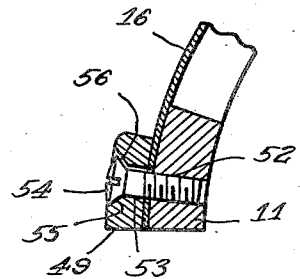
Inventor:
John Bruecker Patented Mar. 11, 1941

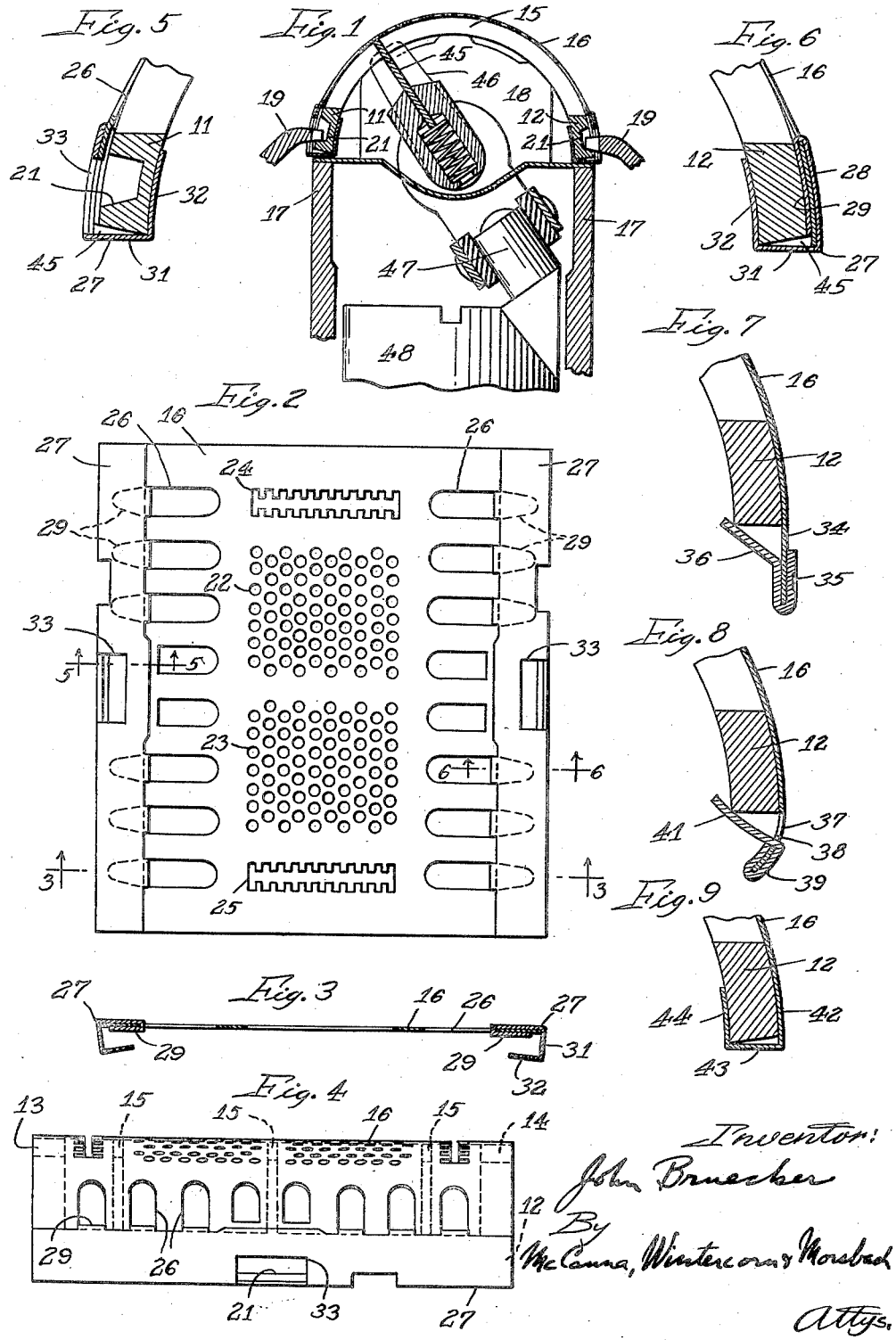

2,234,893

UNITED STATES PATENT OFFICE 2,234,893

SHAVING IMPLEMENT

John Bruecker, Chicago, Ill.

Application November 22, 1939, Serial No. 305,712

8 Claims. (Cl. 30—43)

This invention relates to shaving implements of the type known as "dry shavers" and is a continuation in part of my application Serial No. 178,221, filed December 6, 1937.

The present invention relates more particularly to the construction of the skin-engaging shearing member commonly known as the "comb." As disclosed in my prior application this shearing member is preferably of thin sheet steel perforated to provide hair-receiving openings, the inner edges of which constitute cutting or shearing edges in cooperation with a movable cutter. The shearing member is of such thinness that it does not have sufficient rigidity to be self-sustaining in operation and I have in my prior application provided a skeleton supporting frame to which the thin member is conformed and united. This frame supports the thin shearing member in the desired shearing relation to the movable cutter. Also, in the preferred embodiment the thin shearing member and the supporting frame constitute a replaceable unit well adapted for quick removal and replacement. This unit, because of its construction, promotes greater accuracy and precision in the location of its shearing edges in relation to the movable cutter and thereby improves the cutting qualities in an implement of this kind.

A difficult problem is presented in supporting the shearing member so that the thin resilient portion having the cutting edges will be held with accuracy and precision in relation to the movable cutter. This difficulty is remedied in the present invention, one of the objects of which is to provide improved means for positively clamping the thin resilient member to the skeleton frame without the intervention of any connecting medium such as is employed with soldering or brazing. By this means the thin shearing member will maintain its position indefinitely and the danger of such member becoming loosened or detached from its frame is avoided. This also avoids certain difficulties incidental to soldering and brazing methods.

Another object of my invention is to provide a structure of the character described in which the means for clamping the thin shearing member or plate to the supporting frame serves to resiliently interlock said member and frame for the purposes intended.

Another object of my invention is to provide a structure of the character described in which the means for clamping the thin shearing member or plate to the supporting frame serves to draw or stretch the thin member tightly against the surfaces of the frame on which it is seated, to thereby accurately conform the thin member to the shape of said supporting surfaces and permanently retain it in such shape.

Another object of my invention is to provide improved means for uniting the thin shearing member and the frame with the view to promoting greater economy in the cost of manufacture of these parts.

Another object of my invention is to improve the construction of the thin shearing member and the supporting frame as a replaceable unit by the provision of mechanical means for positively clamping and interlocking the thin shearing member to the frame.

My improvements may be constructed in any of various ways and I have here shown, for purpose of illustration, a number of modifications for this purpose.

Referring to the drawings:

Fig. 1 is a fragmentary sectional view on an enlarged scale of a shearing implement embodying my invention;

Fig. 2 is a plan view of the thin shearing member before it is applied to the supporting frame;

Fig. 3 is a cross-section taken on the section line 3—3;

Fig. 4 is a side elevation of the shearing member applied to the supporting frame, constituting a unit;

Figs. 5 and 6 are enlarged fragmentary sections through the shearing member and supporting frame at the lines of section indicated by 5—5 and 6—6 of Fig. 2;

Figs. 7, 8 and 9 are fragmentary sectional views similar to Fig. 6 showing modified forms;

Fig. 10 is a plan view of the thin shearing member before applied to the supporting frame, showing a further modification of my invention;

Fig. 11 is a cross-section showing the last mentioned modification applied to the frame; and Figs. 12 and 13 are enlarged fragmentary sections of the last named modification as taken at the sectional lines 12—12 and 13—13 respectively of Fig. 10 with the shearing member applied to the frame.

My improvements are preferably, but not necessarily, applied in a replaceable shearing unit at one end of a handle housing which serves to house the mechanism for operating the movable cutter. This mechanism usually includes a small electric motor, but other driving means may be used. In the drawings the handle housing and the motor have been omitted and I have shown only the replaceable shearing unit embodying the subject matter of my invention, together with means for supporting and holding said unit in operative position and a movable cutter cooperating with the thin shearing member of the unit.

In the preferred embodiment the supporting frame part consists of longitudinal members 11 and 12 in spaced parallel relation joined at their ends by curved ribs 13 and 14 and intermediate their ends by one or more similarly curved ribs 15. This constitutes a skeleton frame having the desired shape characteristics to which the thin shearing member or plate designated generally by 16 is united, as claimed in my prior application. The surfaces of the frame on which the thin shearing member is supported, as well as the surfaces which locate and support the unit on the casing or main structure of the shaver, are formed or finished to a high degree of precision in order to accurately position the shearing edges in cooperation with the movable cutter. The unit may be suitably supported, as for example on a casing structure having side walls 17 and end walls 18 (only one of which is here shown). In this instance the unit is removably held in the operative position shown by means of fingers 19 which engage in sockets 21 in the longitudinal frame members 11 and 12 and clamp the unit down in working position on the casing structure. Upon withdrawing the fingers 19 the unit may be removed for cleaning, replacement and similar purposes.

The shearing member 16 is of thin sheet metal, preferably sheet steel which has been tempered so as to provide the desired edge-holding properties when perforated to provide cutting edges. The member or plate 16 is the skin-engaging part of the shearing implement and it is perforated to provide hair-receiving openings, the inner edges of which constitute shearing or cutting edges. These perforations may be of any suitable or preferred form. As shown, the perforations are arranged in the areas intermediate the curved ribs of the supporting frame. In the example here shown the area 22 and 23 are provided with small annular openings adapted for close shaving and the areas 24 and 25 have a different type of opening, including a tooth formation particularly adapted for long hair cutting. The larger perforations 26 in rows along the longitudinal edges are adapted for relief or discharge of the cut hair. The shearing plate is preferably of thin sheet steel hardened and tempered to insure good edge-holding properties. In actual practice I have used plates of different thicknesses, ranging from about .002" to .004". My present invention is not, however, confined to these dimensions.

In the form of my invention shown in Figs. 1 to 6 inclusive I employ a clip of resilient sheet steel fastened to each longitudinal edge portion of the shearing plate and shaped to positively clamp the plate to the adjacent longitudinal member of the supporting frame. In the form shown, a single clip 27 is provided for each longitudinal edge of the plate. Each such clip has a portion 28 provided with a series of fingers 29 passed inwardly through the openings 26 and clamped against the inner side of the plate, and an inwardly turned bottom portion 31 terminating in an upwardly turned portion 32 which positively clamps the adjacent longitudinal frame member 12. Viewing Fig. 3, it will be observed that the clips are channel-shaped in cross section so as to receive the longitudinal members 11 endwise. The portions 31—32 of these clips are so formed as to positively clamp the longitudinal members 11 and 12 when assembled thereon and thus positively secure the shearing plate in working position on the skeleton frame without danger of displacement from such position. The clips are perforated at 33 to provide openings to the sockets 21 for passage of the clamping fingers 19 above mentioned.

In the form shown in Fig. 7, the longitudinal edge portions 34 of the thin plate extend beneath the members 11—12 of the supporting frame and each has attached thereto a clip 35 having an inwardly extending clamping portion 36 which engages the innermost edge of the adjacent frame member and positively clamps the shearing member thereto. In Fig. 8 is shown a modification of this form in which the extended portion 37 of the thin shearing plate is perforated to provide a series of openings 38 for the application of a series of clip fingers 39 of a clip 41 which clamps against the inner edge of the longitudinal frame member and positively clamps the thin shearing plate thereto. In Fig. 9 the thin shearing plate is itself formed to channel-shape as at 42, 43, 44, to positively clamp the sides of the interposed supporting frame member.

In the forms of my invention here disclosed, it will be observed that a pulling force is exerted by the means for fastening the thin shear plate to the frame, tending to draw or stretch the thin plate tightly down against the outer face of the arched ribs. In the form shown in Figs. 1 to 6 inclusive this is effected by the tension imposed by the members 31 and 32 serving to pull the thin plate down against the frame. It will be observed that clearance 45 is provided to allow for the desired resiliency of the members 31—32. The cooperating parts will, of course, be so shaped and proportioned as to insure that they positively clamp and interlock the thin shear plate to the frame and maintain it in the desired operative position thereon. It will also be observed that my invention provides means for holding the thin plate to the supporting frame in such manner as to impose a slight pull on the plate to hold it firmly seated against its supporting members without, however, distorting the shape of the thin plate through its shaving area or that area engaged by the movable cutter.

A movable cutter cooperates with the inner side of the thin shearing plate and is rapidly moved across the same in a cutting action. In the present example a flat cutter 45 is supported by a holder 46 which in turn is mounted in bearings in the end walls 18 to oscillate about the center thereof. Such oscillations are imparted by an eccentric pin 47 carried by a driving member 48 which in turn may be driven by an electric motor in the handle of the housing above mentioned, or by any suitable motive power.

In Figs. 10 to 13 inclusive I have shown another feature of my invention together with a modified form of means for clamping the thin shearing member to the supporting frame. Here I apply to each longitudinal edge of the thin member a rigid bar 49 and fixedly secure each bar to the thin member by means such as rivets 51. The thin member so constructed is then fastened to the outer side of the supporting frame by means of taper head screws 52 passing through openings 53 in the bars and thin members and threaded into the members 12 of the supporting frame. Each opening 53 is countersunk to receive the tapered head 54 of its complemental screw, as shown in Fig. 13. I have now provided that the distance between centers of the holes 53 at opposite sides shall be slightly less than the distance between the opposed threaded openings in the frame members 12 so that when the thin member is applied to the frame and the screws 52 are tightened the tapered heads of the screws will bear against the lower sides 55 of the countersunk holes and exert a slight pull on the thin member sufficient to draw or stretch the body of the thin member to thereby positively conform it to the accurately finished surfaces of the supporting frame on which it is seated and at the same time positively clamp the marginal portions of the thin member to the longitudinal members of the frame. The parts so clamped are shown in Fig. 13 in which clearance 56 is noted between the upper side of the screw and the opposite wall of the hole 55.

While I have shown particular embodiments of my invention, it will be understood that I do not wish to be limited thereto since many modifications may be made, and I therefore contemplate by the appended claims to cover any such modifications as fall within the true spirit and scope of my invention.

I claim:

1. A shaving implement comprising a supporting frame having longitudinal members connected by curved ribs, a thin resilient shearing plate conformed to the curvature of said ribs and extending at its edges into proximity to the longitudinal members of the frame, means for positively clamping the plate to said longitudinal members, and a cooperating movable shearing member.

2. A shaving implement comprising a supporting frame having longitudinal members connected by arched ribs, a thin resilient shearing plate of rectangular shape conformed to the curvature of said ribs and interlocked at its edges with the longitudinal members of the frame, and a cooperating movable shearing member.

3. A shaving implement comprising a supporting frame having longitudinal members connected by curved ribs, a thin resilient shearing plate conforming to the curvature of said ribs and bent inwardly at each longitudinal side to provide a channel-shaped portion for the endwise reception of the adjacent longitudinal frame member, said channel-shaped portions serving to positively clamp the plate to said longitudinal members, and a cooperating movable shearing member.

4. A shaving implement comprising a supporting frame having longitudinal members connected by curved ribs, a thin resilient shearing plate conforming to the curvature of said ribs and extending at its edges into proximity to the longitudinal members of the frame, clips fastened to the edges of the plate and positively clamping the plate to said longitudinal members, and a cooperating movable shearing member.

5. A shaving implement comprising a supporting frame having longitudinal members connected by curved ribs, a thin resilient shearing plate conforming to the curvature of said ribs and extending at its edges into proximity to the longitudinal members of the frame, the plate having perforations adjacent to its said edges, clips engaged in said perforations and fastened to said longitudinal members for positively holding the plate in operative position on the frame, and a cooperating movable shearing member.

6. A shaving implement comprising a supporting frame having longitudinal members connected by curved ribs, a thin resilient shearing plate conforming to the curvature of said ribs and extending at its edges into proximity to the longitudinal members of the frame, the plate having perforations adjacent to its said edges, clamping members fixed to said edges of the plate and positively clamping the plate to said longitudinal members, the clamping members having connection with the plate through said perforations, and a cooperating movable shearing member.

7. A shaving implement comprising a supporting frame having longitudinal members connected by a series of spaced ribs finished to provide accurately located supporting faces, a shearing plate having a perforated shaving area of extreme thinness, means yieldingly but positively clamping the shearing plate to the longitudinal frame members with said shaving area conforming to and supported by the faces of said ribs, and a cooperating movable shearing member.

8. A shaving implement comprising a supporting frame having longitudinal members connected by curved ribs, a thin resilient shearing plate conformed to the curvature of said ribs and extending at its edges into proximity to the longitudinal members of the frame, means for positively drawing the plate down against the curved ribs when conforming the plate thereto and positively clamping the plate to said longitudinal members, and a cooperating movable shearing member.

JOHN BRUECKER.